United States Patent
Collins et al.

(10) Patent No.: US 11,437,614 B2
(45) Date of Patent: Sep. 6, 2022

(54) ENERGY STORAGE DEVICE CONTAINING A PRE-LITHIATED SILICON BASED ANODE AND A CARBON NANOTUBE BASED CATHODE

(71) Applicant: International Business Machines Corporation, Armonk, NY (US)

(72) Inventors: John Collins, Tarrytown, NY (US); Ali Afzali-Ardakani, Ossining, NY (US); Joel P. de Souza, Putnam Valley, NY (US); Devendra K. Sadana, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 16/707,739

(22) Filed: Dec. 9, 2019

(65) Prior Publication Data

US 2021/0175495 A1 Jun. 10, 2021

(51) Int. Cl.
| | |
|---|---|
| *H01M 4/36* | (2006.01) |
| *H01M 4/38* | (2006.01) |
| *H01M 4/587* | (2010.01) |
| *H01M 4/62* | (2006.01) |
| *H01M 10/0568* | (2010.01) |
| *H01M 10/0569* | (2010.01) |
| *H01M 10/052* | (2010.01) |
| *H01M 10/0567* | (2010.01) |

(52) U.S. Cl.
CPC ........... *H01M 4/366* (2013.01); *H01M 4/382* (2013.01); *H01M 4/386* (2013.01); *H01M 4/587* (2013.01); *H01M 4/623* (2013.01); *H01M 4/624* (2013.01); *H01M 10/052* (2013.01); *H01M 10/0567* (2013.01); *H01M 10/0568* (2013.01); *H01M 10/0569* (2013.01); *H01M 2300/0025* (2013.01)

(58) Field of Classification Search
None
See application file for complete search history.

(56) References Cited

U.S. PATENT DOCUMENTS

| | | |
|---|---|---|
| 7,682,750 B2 | 3/2010 | Chen |
| 8,158,282 B2 | 4/2012 | Zhamu et al. |
| 8,790,826 B2 | 7/2014 | Feng et al. |
| 9,139,441 B2 | 9/2015 | Anguchamy et al. |

(Continued)

OTHER PUBLICATIONS

U.S. Appl. No. 16/685,105, Title: Porous Silicon Anode for Rechargeable Metal Halide Battery, filed Nov. 15, 2019, First Named Inventor: Jangwoo Kim, 29 pages.

(Continued)

*Primary Examiner* — Laura Weiner
(74) *Attorney, Agent, or Firm* — Scully, Scott, Murphy & Presser, P.C.; Daniel P. Morris, Esq.

(57) ABSTRACT

An energy storage device is provided that includes a pre-lithiated silicon based anode and a carbon nanotube based cathode. The pre-lithiated silicon anode has a porous region and a non-porous region. The full cell energy storage device has high electrochemical performance which exhibits greater 200 rechargeable cycles with less than 25% after 10 charge discharge cycles relative to the first discharge cycle, a maximum specific discharge capacity greater than 300 mAh/g and a specific capacity of greater than 100 mAh/g for over 130 cycles. Such an energy storage device is scalable for a wide array of applications due to its wafer level processing and silicon-based substrate integrability.

11 Claims, 6 Drawing Sheets

(56) References Cited

U.S. PATENT DOCUMENTS

| | | | |
|---|---|---|---|
| 9,142,833 | B2 | 9/2015 | Tolbert et al. |
| 2004/0214085 | A1 | 10/2004 | Sheem et al. |
| 2009/0186267 | A1 | 7/2009 | Tiegs |
| 2013/0078508 | A1 | 3/2013 | Tolbert et al. |

OTHER PUBLICATIONS

U.S. Appl. No. 16/032,317, Title: Silicon Substrate Containing Integrated Porous Silicon Electrodes for Energy Storage Devices, filed Jul. 11, 2018, First Named Inventor: John Collins, 54 pages.

U.S. Appl. No. 16/026,461, Title: Battery Structure With an Anode Structure Containing a Porous Region and Method of Operation, filed Jul. 3, 2018, First Named Inventor: Joel P. de Souza, 51 pages.

U.S. Appl. No. 16/026,473, Title: Rechargeable Lithium-Ion Battery With an Anode Structure Containing a Porous Region, filed Jul. 3, 2018 First Named Inventor: Joel P. de Souza, 48 pages.

U.S. Appl. No. 16/026,426 Title: Method of Making an Anode Structure Containing a Porous Region, filed Jul. 3, 2018, First Named Inventor: Joel P. de Souza, 48 pages.

U.S. Appl. No. 16/026,448, Title: Kinetically Fast Charging Lithium-Ion Battery, filed Jul. 3, 2018, First Named Inventor: Joel P. de Souza, 48 pages.

Zhao, Y., et al., "A 3.5 V Lithium-Iodine Hybrid Redox Battery with Vertically Aligned Carbon Nanotube Current Collector", American Chemical Society, Jan. 29, 2014, pp. 1085-1092.

Li, X., et al., "Mesoporous silicon sponge as an anti-pulverization structure for high-performance lithium-ion battery anodes", Nature Communications, Jul. 8, 2014, 7 pages.

ENERGY STORAGE DEVICE CONTAINING A PRE-LITHIATED SILICON BASED ANODE AND A CARBON NANOTUBE BASED CATHODE

BACKGROUND

The present application relates to an energy storage device, and more particularly to an energy storage device such as, for example, a lithium-ion battery, which has a high-energy capacity, and long lifetime reversible charge storage.

Discovering materials which are both compatible in complementary metal oxide semiconductor (CMOS) circuitry and of high charge density is at the forefront of technological innovation. Such charge storage innovation will foster the next generation of mobile electronic capabilities including, micro-applications in the Internet-Of-Thing (IOT) sector, and more conventionally sized applications such as electric vehicles, grid energy storage, and renewable energy storage.

One aspect, which is particularly appealing in the development of such innovation, is the use of silicon as an electrode material. The theoretical specific capacity of silicon surpasses that of lithium metal (greater than 3900 mAh/g). However, silicon expands in volume up to 400% upon its lithium charge state, and then compresses about 400% upon discharge. This mechanically self-pulverizing mechanism of silicon has been one of the hurdles in implementing silicon as a commercial electrode material for the next generation of energy storage devices. There is thus a need to provide an energy storage device that includes silicon as an electrode which avoids the self-pulverizing mechanism.

SUMMARY

An energy storage device is provided that includes a pre-lithiated silicon based anode and a carbon nanotube based cathode. The pre-lithiated silicon anode has a porous region and a non-porous region. The full cell energy storage device has high electrochemical performance which exhibits greater 200 rechargeable cycles with less than 25% after 10 charge discharge cycles relative to the first discharge cycle, a maximum specific discharge capacity greater than 300 mAh/g and a specific capacity of greater than 100 mAh/g for more than 130 cycles. Such an energy storage device is scalable for a wide array of applications due to its wafer level processing and silicon-based substrate integrability.

In one aspect of the present application, an energy storage device is provided that has high-energy capacity, and long lifetime reversible charge storage. In one embodiment, the energy storage device includes a silicon based anode containing a porous region and a non-porous region. A lithium metal layer is located on, and is absorbed at least partially into, a topmost surface of the porous region of the silicon based anode. A liquid electrolyte has a first surface that forms an interface with the lithium metal layer. A carbon nanotube based cathode forms an interface with a second surface of the liquid electrolyte, which is opposite the first surface of the liquid electrolyte. An ionic-permeable and electron-insulating separator is located in the liquid electrolyte and is positioned between the silicon based anode and the carbon nanotube based cathode.

In one preferred embodiment, the energy storage device includes a crystalline silicon based anode containing a porous region and a non-porous region, wherein the porous region includes a top porous layer having a first thickness and a first porosity, and a bottom porous layer having a second thickness that is greater than the first thickness, and a second porosity that is greater than the first porosity, and wherein the bottom porous layer forms an interface with the non-porous region. A lithium metal layer is located on, and is absorbed at least partially into, the top porous layer of the crystalline silicon based anode. A liquid electrolyte composed of a mixture of ethylene carbonate, dimethyl carbonate, lithium hexafluorophosphate, and fluoroethylene carbonate has a first surface that forms an interface with the lithium metal layer. A carbon nanotube based cathode composed of a carbon nanotube active material, polyvinylidene fluoride, and lithium bis(trifluoromethanesulfonyl)imide forms an interface with a second surface of the liquid electrolyte, which is opposite the first surface of the liquid electrolyte. An ionic-permeable and electron-insulating separator is located in the liquid electrolyte and is positioned between the silicon based anode and the carbon nanotube based cathode.

In another aspect of the present application, a method of forming a carbon nanotube based cathode useful in an energy storage device is provided. In one embodiment, the method includes adding, in any order, a carbon nanotube active material, a binding agent, and a conductive lithium containing salt to a solvent to provide a mixture. This mixture is then mixed until a homogeneous solution is obtained. The homogeneous solution is then applied to a substrate, and thereafter dried.

DETAILED DESCRIPTION

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

Figure 1:
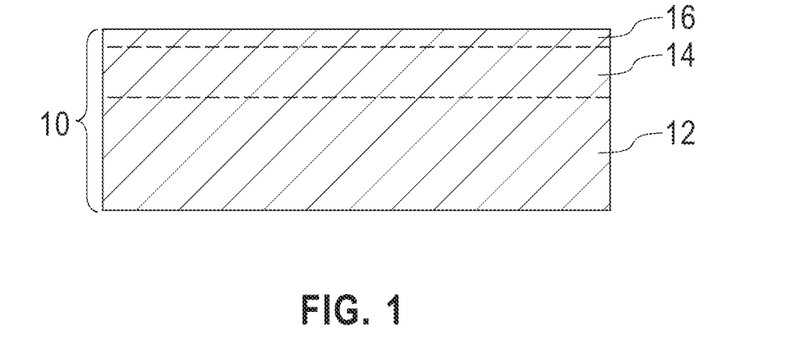
FIG. 1 is a cross sectional view of an exemplary silicon based anode containing a porous region and a non-porous region that can be employed in the present application.

Referring first to FIG. 1, there is illustrated an exemplary silicon based anode 10 containing a non-porous region 12 and a porous region (14, 16) that can be employed in the present application. The silicon based anode 10 that can be used in the present application is fully described in U.S. Ser. No. 16/026,461 entitled "Battery Structure with an Anode Structure Containing a Porous Region and Method of Operation", filed on Jul. 3, 2018, the entire content and disclosure of which is incorporated herein by reference.

Notably, the porous region (14, 16) of the silicon based anode 10 includes a top porous layer 16 (i.e., Porous Region 1) having a first thickness and a first porosity, and a bottom porous layer 14 (i.e., Porous Region 2) having a second thickness that is greater than the first thickness, and a second porosity that is greater than the first porosity. The bottom porous layer 14 (i.e., Porous Region 2) is located beneath the top porous layer 16 (i.e., Porous Region 1) and forms an interface with the non-porous region 12 of the silicon based anode 10.

The silicon based anode 10 is composed of a silicon-containing material. The term "silicon-containing material" is used throughout the present application to denote a material that includes at least silicon and has semiconductor material properties. Examples of silicon-containing materials that can be employed as the silicon based anode 10 include crystalline silicon (Si), a silicon germanium alloy, a p-type doped silicon, boron doped silicon or a carbon-doped silicon based alloy. Typically, the silicon based anode 10 is composed entirely of crystalline silicon (Si) or boron doped silicon (about 1E19). The term 'about' is used throughout the present application to denote that a value can be within ±10% of the recited value.

The term "p-type" refers to the addition of impurities to an intrinsic semiconductor that creates deficiencies of valence electrons. In a silicon-containing semiconductor material, examples of p-type dopants, i.e., impurities, include, but are not limited to, boron, aluminum, gallium and indium. The concentration of p-type dopant within the silicon-containing material that provides silicon based anode 10 can range from 1E16 atoms/cm$^3$ to 3E20 atoms/cm$^3$.

The term "n-type" refers to the addition of impurities that contributes free electrons to an intrinsic semiconductor. In a silicon containing semiconductor material, examples of n-type dopants, i.e., impurities, include, but are not limited to, antimony, arsenic and phosphorous. The concentration of n-type dopant within the silicon-containing material that provides silicon based anode 10 can range from 1E16 atoms/cm$^3$ to 1E21 atoms/cm$^3$.

In some embodiments of the present application, at least an upper portion of the non-porous region 12 and the entirety of the porous region (14, 16) are composed of crystalline silicon. The non-porous region 12 and the porous region (14, 16) are of unitary construction, i.e., a single piece.

The top porous layer 16 (i.e., Porous Region 1) has a first porosity and a first thickness, and the bottom porous layer 14 (i.e., Porous Region 2) has a second porosity and a second thickness. In order to accommodate volume changes during charging and discharging, the porous region (including Porous Region 1 and Porous Region 2) is engineered such that the second porosity and second thickness are greater than the first porosity and first thickness, respectively. In one embodiment, the second porosity has an average pore opening of greater than 3 nm, and the second thickness is between 0.1 µm to 30 µm, while the first porosity has an average pore opening of less than 3 nm, and the first thickness is 70 nm or less.

In the present application, the porosity can be a measure of the volume percentage of the pores (void region in the silicon) divided by the total volume of the porous region (including Porous Region 1 and Porous Region 2). The porosity may be measured using techniques well known to those skilled in the art including, for example, SEM, RBS, X-ray Diffraction (XRD), Nuclear Magnetic Resonance (NMR), Raman Spectroscopy, gas-on-solid adsorption (porosimetry), mercury space filling porosimetry, density functional theory (DFT), or Brunauer-Emmett-Teller (BET).

In some embodiments, a porous region (14, 16) that has a porosity that is 30% or greater is avoided, which as in the prior art, tends to be brittle and may crack during use such that battery failure may occur. Without wishing to be bound by any theory, it is speculated that the porous region (14, 16) has a porosity such that a sufficient open space within the porous region (14, 16) exists to accommodate volume expansion (i.e., swelling) and/or deformation of both Porous Region 1 (i.e., the top porous layer 16) and to a lesser extent Porous Region 2 (i.e., the bottom porous layer 14).

The bottom porous layer 14 (i.e., Porous Region 2) can have a compressive stress from 0.02 percent to 0.035 percent. Compressive stress can be determined by X-ray Diffraction or other optical or spectroscopic techniques.

As mentioned above, the silicon based anode 10 shown in FIG. 1 is of unitary construction. Thus, non-porous region 12 and porous region (14, 16) are electrically, chemically and mechanically part of a same structure. In some embodiments, the Porous Region 1 (i.e., the top porous layer 16), Porous Region 2 (i.e., the bottom porous layer 14) and the non-porous region 12 are entirely composed of crystalline silicon. In this embodiment, the silicon based anode 10 is created by efficient method steps. In addition, and in embodiments in which the silicon based anode 10 is made of the same semiconductor material (i.e., Si), there are no mechanical stresses or additional electrical resistances within the silicon based anode 10 that might be caused by interfaces between dissimilar materials. In one example, the silicon based anode 10 including the non-porous region 12 and the porous region (14, 16) has a three-dimensional (3D) lattice framework composed of a p-type crystalline silicon material.

In some embodiments, at least an upper portion of the non-porous region 12 of the silicon based anode 10 that forms an interface with the lower porous layer 14 (i.e. Porous Region 2) as well as the entire porous region (14, 16) are composed of a same material such as, for example, p-type doped silicon material, while a lower portion of the non-porous region 12 may be composed of a different semiconductor material than the upper portion of the non-porous region 12 that forms an interface with the lower porous layer 14 (i.e., Porous Region 2). For example, the lower portion of the non-porous region 12 that is present beneath the lower porous layer 14 (i.e., Porous Region 2) includes doped silicon having a different dopant concentration than the original p-type doped silicon used to provide the silicon base anode 10, or a silicon germanium alloy containing less than 10 atomic percent germanium.

In some embodiments and due to the simplicity and manufacturability of single crystalline material, the silicon material that provides at least an upper portion of the non-porous region 12 that forms an interface with the lower porous layer 14 (i.e., Porous Region 2) as well as the entire porous region (14, 16) is single crystalline. In some embodiments, the cost of the process can be reduced and controlled by using lower grade silicon and by adjusting the silicon thickness and simplified crystal growth techniques (as is the case observed in the solar industry).

The silicon based anode 10 of FIG. 1 can be formed by an anodization process. In one embodiment, the anodization process is performed utilizing a constant current source that operates at a current density from 0.05 mA/cm$^2$ to 150 mA/cm$^2$, wherein mA is milli-Amperes. In some examples, the current density is 1 mA/cm$^2$, 2 mA/cm$^2$, 5 mA/cm$^2$, 50 mA/cm$^2$, or 100 mA/cm$^2$. In a preferred embodiment, the current density is from 1 mA/cm$^2$ to 10 mA/cm$^2$. The current density may be applied for 1 second to 5 hrs. In some examples, the current density may be applied for 5 seconds, 30 seconds, 20 minutes, 1 hour, or 3 hours. In an embodiment, the current density may be applied for 10 seconds to 1200 seconds, specifically for the doping level in the range $10^{19}$ cm$^3$ range. The anodization process is typically performed at nominal room temperature from (20° C. to 30° C.) or at a temperature that is slightly elevated from room temperature.

Following the anodization process, the silicon based anode 10 is typically rinsed with deionized water and then dried. In some embodiments, and preceding the anodization process, prior to formation of the silicon based anode 10 containing the porous region (14, 16), the starting silicon substrate can be washed with an aqueous organic solvent, first rinsed with a mixture of deionized water, ammonium hydroxide, and hydrogen peroxide (5:1:1 by volume) at a temperature from 60° C. to 80° C., for a period of time from 5 minutes to 30 minutes, and thereafter second rinsed in deionized water.

Figure 2:
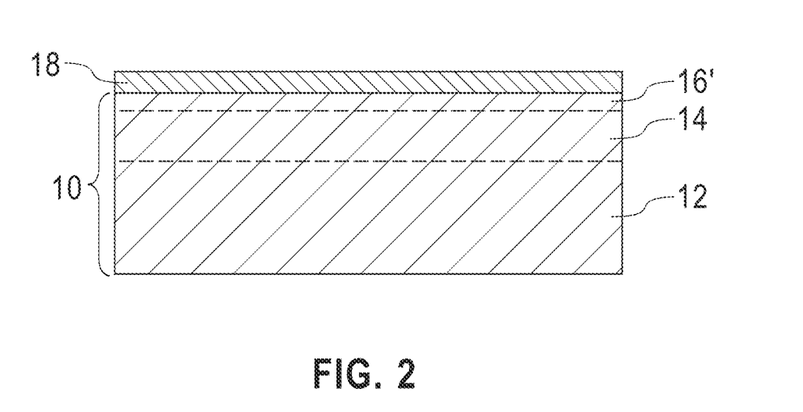
FIG. 2 is a cross sectional view of the exemplary silicon based anode of FIG. 1 after pre-lithiating the silicon based anode to provide a lithium metal layer located on, and absorbed at least partially into, a topmost surface of the porous region of the silicon based anode.

Referring now FIG. 2, there is illustrated the exemplary silicon based anode of FIG. 1 after pre-lithiating the silicon based anode 10 to provide a lithium metal layer 18 located on, and absorbed at least partially into, a topmost surface of the porous region (14, 16) of the silicon based anode 10. The lithium metal layer 18 is a continuous layer that forms an interface with the top surface of the porous region (i.e., the top porous layer 16) of the silicon based anode 10.

This step of the present application provides a pre-lithiated silicon based anode that is highly sustainable under rechargeable, electrochemical conditions. Moreover, the pre-lithiated silicon based anode of the present application exhibits long-term rechargeable use as compared to an equivalent silicon based anode that lacks the lithium metal layer 18. The term "long-term rechargeable" is used throughout the present application to denote an electrochemical energy storage device, such as those outlined in the present application, which enables a high number of charge and discharge electrochemical cycles—which illustrate high capacity and relatively small differences in the magnitude of charge stored in the charge cycle compared with the discharge cycle.

Moreover, the lithium metal layer 18 that is located on, and absorbed at least partially into, a topmost surface of the porous region of the silicon based anode 10 prevents lithium material from inducing the self-pulverizing degradation mechanism between lithium and crystalline silicon as is observed after many rechargeable cycles (i.e., greater than 230) for silicon based anodes that lack the lithium metal layer 18.

In some embodiments of the present application, the lithium metal is absorbed into at least a portion, or an entirety, of the top porous layer 16. In the drawings, element 16' denotes that the top porous layer of the silicon based anode 10 is lithiated. In other embodiments (not shown), the lithium metal layer is absorbed into the entire thickness of the porous region (14, 16) of the silicon based anode 10. In such an embodiment, the bottom lithiated porous layer forms and interface with the non-porous region 12. The lithium metal layer 18 that is located on the topmost surface of the porous region (14, 16) of the silicon based anode 10 generally has a thickness of greater than, or equal to, 10 nm. More typically, the lithium metal layer 18 that is located on the topmost surface of the porous region (14, 16) of the silicon based anode 18 generally has a thickness from 15 nm to 100 nm.

The lithium metal layer 18 can be formed by depositing a layer of molten lithium onto the surface of the porous region (14, 16) from a common lithium metal source (e.g., a lithium foil). The molten lithium can now diffuse into the porous region (14, 16) of the silicon based anode 10. The molten lithium can be composed of a lithium metal source (e.g., lithium metal foil or particles, etc.). In some embodiments of the present application, a heating step can be performed at a temperature of greater than 170° C. to provide the molten lithium metal. The heating can be performed in an inert ambient such as, for example, helium (He), neon (Ne), and/or argon (Ar). In one example, heating is performed at 180° C. in an argon atmosphere glove box. The molten lithium metal is then cooled to provide a lithium metal layer 18 that is composed of the lithium metal topmost layer. Cooling is performed from the heating temperature to nominal room temperature which can be in a range from 15° C. to 25° C., or below.

In some embodiments of the present application, the lithium metal layer 18 can be formed by an electrochemical lithiation process. The electrochemical lithiation process can include discharging lithium ions from a lithium source (e.g., lithium metal or lithium metal foil) into the porous region (14, 16) of the silicon based anode 10 of FIG. 1 at a very slow rate for extended periods of time. C-rates are common metrics used to indicate the rate of a battery's discharge relative to its maximum capacity (e.g., 1C rate indicates the entire silicon electrode will discharge the entire reversible stored charge in 1 hour). Typically, the C-rates that can be used in the present application range from 0.001 C rate to 0.1 C. In a preferred embodiment, C-rates used in the present application can range from 0.005 C to 0.05 C. Typical pre-lithiation times can range from 5 hours to 70 hours. In a preferred embodiment, 5 to 25 hours are used to pre-lithiate the porous silicon anodes 10 of FIG. 1. In a preferred embodiment, pre-lithiation with a C-rate in the range of 0.01C for times between for 5 to 25 hours are used.

Figure 3:
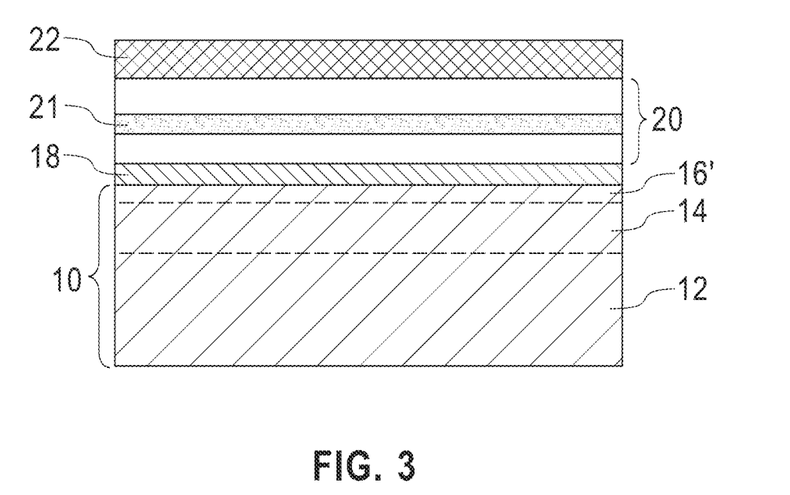
FIG. 3 is a cross sectional view an exemplary energy storage device that includes the pre-lithiated silicon based anode of FIG. 2, a liquid electrolyte, and a carbon nanotube based cathode in accordance with the present application.

Referring now to FIG. 3, there is illustrated an exemplary energy storage device that includes the pre-lithiated silicon based anode of FIG. 2, a liquid electrolyte 20, and a carbon nanotube based cathode 22. Although not shown, an anode current collector can be located beneath the silicon based anode 10, and a cathode current collector can be located above the carbon nanotube based cathode 22. The anode current collector and the cathode current collector can be composed of any well known conductive material such as, for example, nickel, platinum, or aluminum. Although not shown, the energy storage device of FIG. 3 can be encased within conventional battery encasing materials such as, for example, stainless steel based coin cell materials which enable both an environmentally protected seal as well as a constant pressure applied on top of and below the full cell battery layers, such as those shown in FIG. 3.

The liquid electrolyte 20 that can be used in the present application includes any liquid electrolyte that can be used in a lithium-ion energy storage device. Common components of liquid electrolyte mixtures include, but are not limited to, ethylene carbonate, dimethyl carbonate, lithium hexafluorophosphate, and diethyl carbonate. In some embodiments, the liquid electrolyte that is employed includes a fluorine additive such as, for example, fluoroethylene carbonate (FEC). In the present application, the presence of a fluorine additive within a liquid electrolyte can provide high electrochemical integrity and long-term cycling without runway electrolyte degradation.

In one embodiment of the present application, the liquid electrolyte 20 is a mixture of ethylene carbonate, dimethyl carbonate, lithium hexafluorophosphate, and fluoroethylene carbonate. In another embodiment, the liquid electrolyte 20 is a mixture of lithium hexafluorophosphate in a solution of dimethyl carbonate and fluoroethylene carbonate with a solvent ratio of 4:1. In another embodiment, the liquid electrolyte 20 is a mixture of lithium hexafluorophosphate in a 1:1:1 solution of dimethyl carbonate, diethyl carbonate, and ethylene carbonate and fluoroethylene carbonate with a solvent ratio of 4:1. In another embodiment, the liquid electrolyte 20 is a mixture of lithium hexafluorophosphate in a solution of dimethyl carbonate and ethylene carbonate with a solvent ratio of 1:1. In another embodiment, the liquid electrolyte 20 is a mixture of lithium hexafluorophosphate in a solution of diethyl carbonate and ethylene carbonate with a solvent ratio of 1:1, with 10% v/v fluoroethylene carbonate. In another preferred embodiment, the liquid electrolyte 20 is a mixture of lithium hexafluorophosphate in a solution of dimethyl carbonate, diethyl carbonate and ethylene carbonate with a solvent ratio of 1:1:1. Note that if electrochemical pre-lithiation is the method utilized to pre-lithiate the porous silicon substrates of FIG. 1, then the liquid electrolytes used for pre-lithation and subsequent construction of the full battery device in FIG. 3 can be composed of the same liquid electrolyte composition or be different, and any combination of the above described mixtures or combinations of the solvents listed above when formulated with lithium hexafluorophosphate.

The liquid electrolyte 20 includes a separator 21 which divides the liquid electrolyte into a first electrolyte region and a second electrolyte region. The separator 21 acts as an ionic-permeable, but electron insulating layer between the two opposing electrodes (i.e., anode and cathode). The separator 21 can include one or more of a flexible porous material, a gel or a sheet that is composed of cellulose, cellophane, poly vinyl acetate (PVA), PVA/cellulous blends, polyethylene (PE), polypropylene (PP) or mixtures of PE and PP. The separator 21 can also be composed of inorganic insulating nano/microparticles. The separator 21, which is present in the liquid electrolyte 20, is located between the pre-lithiated silicon based anode and the carbon nanotube based cathode 22.

The carbon nanotube based cathode 22 of the present application includes a binding agent, and a carbon nanotube active material. In some embodiments, the carbon nanotube based cathode 22 can also include conductive additive materials (e.g., carbon black or carbon micro/nanoparticles) and/or a conductive lithium containing salt. In one example, the carbon nanotube based cathode 22 includes a carbon nanotube active material, a binding agent and a conductive lithium containing salt.

Examples of binding agents that can be used in the present application include polyvinylidene fluoride (PVDF), styrene based hydrophilic binders such as a styrene-butadiene copolymer, conductive binder materials, or lithium conductive salt containing polymer materials, or combinations of the like. Examples of conductive lithium containing salts that can be used in the present application include, but are not limited to, lithium hexafluorophosphate, lithium perchlorate, lithium trifluoromethanesulfonate, lithium fluoride, $LiBF_4$, lithium chloride, lithium phosphate compounds, lithium bromide compounds, lithium bis(trifluoromethanesulfonyl) imide (LiTFSI), lithium difluoro(oxalato)borate (LiDFOB), or lithium bis(oxalato)borate (LiBOB). In a highly preferred embodiment, the carbon nanotube based cathode 22 is composed of a carbon nanotube active material, polyvinylidene fluoride, and lithium bis(trifluoromethanesulfonyl) imide (LiTFSI).

The carbon nanotube active material that can be used in the present application as a component of the carbon nanotube based cathode 22 has a high surface area (on the order of about 50 $m^2/g$—with theoretical surface areas greater than 1200 $m^2/g$), and maintains excellent structural stability as a cathode material when utilized in an energy storage device with a pre-lithiated silicon based anode as described above. In some embodiments of the present application, the carbon nanotube active material that can be employed in the present application is a single-walled carbon nanotube that is composed of carbon with diameters typically measured in nanometers. In other embodiments of the present application, the carbon nanotube active material that can be employed in the present application is a multi-walled carbon nanotube that is consists of nested single-walled carbon nanotubes. In yet other embodiments, a mixture of single-walled and multi-walled carbon nanotubes can be used as the carbon nanotube active material. Notwithstanding the type of carbon nanotube active material employed, the carbon nanotube active material is electrical conductivity and it has an exceptional tensile strength and thermal conductivity because of its nanostructure and strength of the bonds between carbon atoms.

In some embodiments, the carbon nanotube active material can have its metallic properties altered (i.e., doped carbon nanotubes). The dopant that can be present in the carbon nanotube active material can include bis-triflimide (TFSI), iodine dopants such as combinations of lithium and iodine or iodide based materials. In other embodiments, the carbon nanotube active material is non-doped; i.e., it does have its metallic properties altered directly from doping materials. In yet other embodiments, the carbon nanotube active material can include a combination of doped and undoped carbon nanotubes.

The carbon nanotube active material can be made utilizing techniques that are well known those skilled in the art. The carbon nanotubes that provide the carbon nanotube active material may have various circumferences, diameters, lengths and/or wall thicknesses. In one embodiment, the carbon nanotubes that provide the carbon nanotube active material can be single-walled carbon nanotubes with typical dimensions such as, for example, a diameter from 0.5 nm to 4 nm, a length from 30 nm to 1800 nm, a wall thickness on the order of 0.35 nm, with the option of a carbon nanotube distribution mixture using any combination of the above cited ranges dimensional ranges. In another embodiment, the carbon nanotubes that provide the carbon nanotube active material can be multi-walled nanotubes with typical dimensions such as, for example, a diameter from 3 nm to 70 nm, a length from 30 nm to 1800 nm, a wall thickness on the order of 0.35 nm with cumulative multi-wall thickness from less than 400 nm to greater than 14000 nm, with the option of a carbon nanotube distribution mixture using any combination of the above cited ranges dimensional ranges. The option of a carbon nanotube distribution mixture using any combination of the above cited single-walled or multi-walled mixture components with any combination of the above cited ranges dimensional ranges is also possible.

In one embodiment, the carbon nanotube based cathode 22 of the present application can be formed by a method that includes adding, in any order, a carbon nanotube active material, as defined above, a binding agent, as defined above, and a conductive lithium containing salt, as defined above, to a solvent to provide a mixture. The solvent can include any conventional organic solvent such as, for example, N-methyl-2-pyrrolidone, aprotic organic or water-free solvents. The non-solvent components of a cathode mixture can contain from 2 weight percent to 12 weight percent of the carbon nanotube active material, from 50 weight percent to 80 weight percent of the binding agent, and from 8 weight percent to 48 weight percent the conductive lithium containing salt, combined with solvent (e.g., 60 ml to 300 ml of solvent). In one embodiment, the order of addition is to first combine the solid components of the cathode mixture, followed by the solvent, and mixing until a homogenous solution is created. In another embodiment, the homogenous solution is allowed to dry at or around 100° C. for 6 hrs to 24 hrs on a 2D or 3D-patterned Teflon substrate to form a 2D or mold-formed solid composite. In one preferred embodiment, the binding agent is polyvinylidene fluoride, the conductive lithium containing salt is lithium bis(trifluoromethanesulfonyl)imide, and the solvent is N-methyl-2-pyrrolidone.

The aforementioned mixture is then mixed with the aid of a stirring mechanism until a homogeneous solution is obtained. A solution is homogeneous where the ratio of solute (i.e., carbon nanotube active material, binding agent, and conductive lithium containing salt) to solvent remains the same throughout the solution and the particles are not visible with the naked eye, even if homogenized with multiple sources. In homogeneous solutions, solutes will not settle out after any period of time and they can't be removed by physical methods, such as a filter or centrifuge. The homogeneous solution has one phase (i.e., liquid), although the phase of the solute and solvent may initially have been different).

The homogeneous solution can also be applied to a substrate and then dried. The applying of the homogeneous solution can include a deposition process such as, for example, drop casting, spread casting, roller casting, doctor blading, heated casting/pressing/rolling/blading techniques, or spin coating combined or not combined with any of the above processes. The substrate can be any substrate such as, for example, a Teflon® substrate that contains a 3D feature for housing the solution. Drying can be performed at various drying temperatures and durations. In one example, drying can be performed at a temperature of about 100° C. overnight. After drying the carbon nanotube based cathode 22 can be removed from the substrate and placed upon the liquid electrolyte 20. In another embodiment, the cathode mixture can be cast onto a conductive cathode current collector, with or without additional adhesive binder materials (e.g., polyaniline, or LiTFSI/Polyaniline mixtures), with the casting and processing using any combination of the above listed methods.

In one preferred embodiment, the energy storage device includes a crystalline silicon based anode 10 containing a porous region 12 and a non-porous region (14, 16), wherein the porous region includes a top porous layer 16 having a first thickness and a first porosity, and a bottom porous layer 14 having a second thickness that is greater than the first thickness, and a second porosity that is greater than the first porosity, and wherein the bottom porous layer 14 forms an interface with the non-porous region 12. A lithium metal layer 18 is located on, and is absorbed at least partially into, the top porous layer 16 of the silicon based anode 10. A liquid electrolyte 20 composed of a mixture of ethylene carbonate, dimethyl carbonate, lithium hexafluorophosphate, and fluoroethylene carbonate has a first surface that forms an interface with the lithium metal 18. A carbon nanotube based cathode 22 composed of a carbon nanotube active material, polyvinylidene fluoride, and lithium bis (trifluoromethanesulfonyl)imide forms an interface with a second surface of the liquid electrolyte 20, which is opposite the first surface of the liquid electrolyte. An ionic-permeable and electron-insulating separator 21 is located in the liquid electrolyte 20 and between the pre-lithiated silicon based anode 10 and the carbon nanotube based cathode 22.

The energy storage device of the present application including the preferred one mentioned above has a high-capacity-with the pre-lithiated silicon anode having a theoretical capacity on the order of about 3900 mAh/g or greater—and the full cell (carbon nanotube based cathode, electrolyte and pre-lithiated porous silicon anode, having a reversible discharge capacity of greater than, or equal to, 290 mAh/g, and a maximum discharge capacity of greater than, or equal to, 300 mAh/g. The energy storage device of the present application including the preferred one mentioned above has a discharge capacity fade on a tenth discharge cycle that is less than, or equal to, 25% relative to a first discharge cycle, and a specific gravimetric capacity that is greater than, or equal to, 100 mAh/g for at least 130 cycles.

In the present application, and during charging and discharging, the lithium metal layer physically separates and impedes the diffusion of lithium particles between electrochemically pulverized silicon based material, which is above the lithium metal layer, and porous and/or crystalline silicon, which is below the lithium metal layer.

It is noted that with repeated electrochemical charge and discharging of the energy storage device of the present application including the preferred one mentioned above, the lithium metal layer progressively migrates deeper into the porous region of the silicon based anode and the lithium metal layer, on average, increases in size. Also, the progressively deeper migrating and thickness increasing lithium metal layer chemically and physically separates pulversized (volume expanded >100%) lithium and/or silicon based porous silicon electrode material with non-pulverized (volume expanded <100%) lithium and/or silicon based porous silicon electrode material. Further, the energy storage device of the present application including the preferred one mentioned above have a rechargeable cycle life with a less than 25% capacity fade, relative to the first magnitude of the first discharge cycle, after the first 10 charge/discharge cycles, and wherein the total cycle life is increased by greater than 100% when compared to the same energy storage device with a crystalline silicon anode instead of the pre-lithiated porous silicon anode as described herein. The energy storage device of the present application including the preferred one mentioned above also have a rechargeable cycle life with less than 25% capacity fade that is increased by greater than 100% when compared to the same energy storage device with a non-pre-lithated porous silicon anode instead of the pre-lithiated porous silicon electrode of the present application.

Figure 4A:
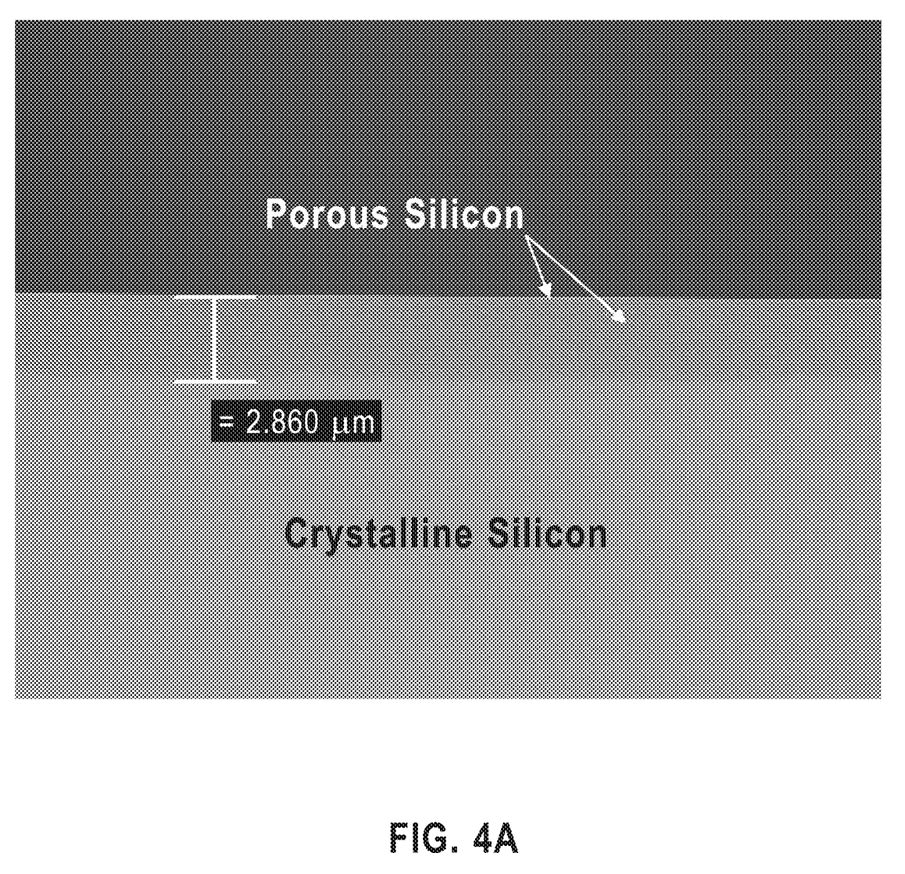
FIG. 4A is a cross sectional scanning electron micrograph (SEM) of a silicon based anode prior to pre-lithiation.
Figure 4B:
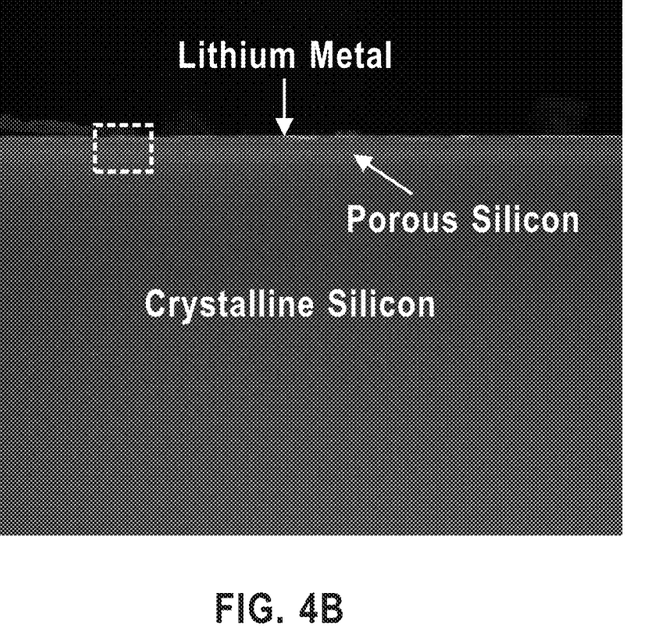
FIG. 4B is a cross sectional SEM of the silicon based electrode of FIG. 4A after pre-lithiation of the silicon based anode.
Figure 4C:
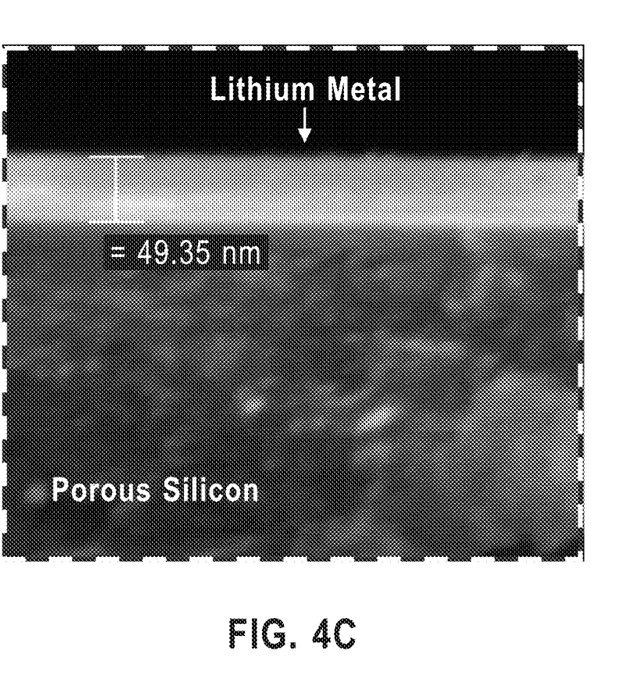
FIG. 4C is a cross sectional SEM of the insert region highlighted in FIG. 4B.

Reference now is made to FIGS. 4A, 4B and 4C which are cross sectional SEMs of a crystalline silicon based anode prior to pre-lithiation (FIG. 4A) and the same silicon based electrode after pre-lithiation (FIGS. 4B and 4C). The silicon based anode 10 is composed of a porous region (14, 16) and a non-porous region 12 as mentioned above. In the SEM, the individual porous layers of the porous region (14, 16) are not specifically identified. Pre-lithiation of the silicon based electrode was performed utilizing the molten lithium process mentioned above using molten lithium metal (temperature greater than 170° C.) as the lithium source for pre-lithiation. These SEMs clearly show that a lithium metal layer forms on an upper porous surface of a silicon based anode 10.

Figure 5:
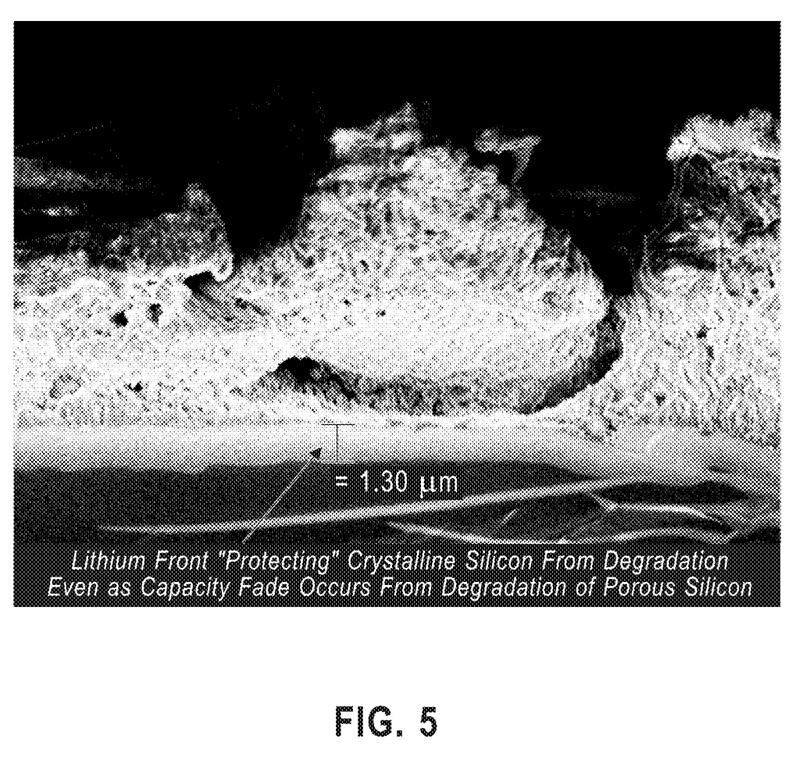
FIG. 5 is a cross sectional SEM of an actual energy storage device in accordance with the present application and after long-term electrochemical use.

Referring now to FIG. 5, there is a cross sectional SEM of an actual energy storage device in accordance with the present application and after use. The actual energy storage device of FIG. 5 includes the preferred energy storage device mentioned above. As noted in the SEM, a lithium front is formed that protects the crystalline silicon from degradation even as capacity fades occurs from degradation of the porous silicon. This SEM demonstrates that the pre-lithiated silicon anode of the present application enables a 'seed' type lithium layer for homogeneous, controlled lithiation of the silicon based anode—where with repeated charging and discharging of the full electrochemical energy storage device, the seed layer progresses through the porous region (14, 16) of the silicon based anode 10. As the seed layer progresses through the porous silicon region (14, 16) of the silicon based anode 10, the expansion and compression electrode pulverization phenomena, well known in the Lithium/Silicon charge storage material research and literature, is allowed to occur primarily above the crystalline silicon component of the silicon based electrode 10 and on top of the lithium metal seed layer—thereby protecting the bulk of the crystalline silicon component of the silicon based electrode 10 from excessive lithiation and pulverization susceptibility—and thereby extending the rechargeable lifetime of the energy storage device's high charge storage performance. Once the lithium front reaches the crystalline silicon component of the silicon based electrode 10, with repeated cycling, the lithium front acts as a protective cap to maintain the mechanism and physical integrity of the crystalline silicon and therefore the high function of the energy storage device, as displayed in FIG. 5 with the thick 1.30 micron lithium metal layer separating partially pulverized Lithium/Silicon electrode (above the lithium metal layer) from the crystalline silicon component of the silicon based electrode 10 (below the lithium metal layer). The lithium metal front can be plated and stripped (but never fully disappears) through the charge/discharge cycling of the energy storage device. Typically, the thickness of the lithium metal layer increases with repeated charge and discharge of the electrochemical cell. As can be seen by comparing FIG. 4C and FIG. 5, the initial lithiation thickness of the pre-lithiated porous silicon electrode is approximately 49 nm and the final thickness of the lithium "seed" layer is approximately 1.3 microns after the seed layer has reached the crystalline silicon component of the silicon based electrode 10.

Figure 6A:
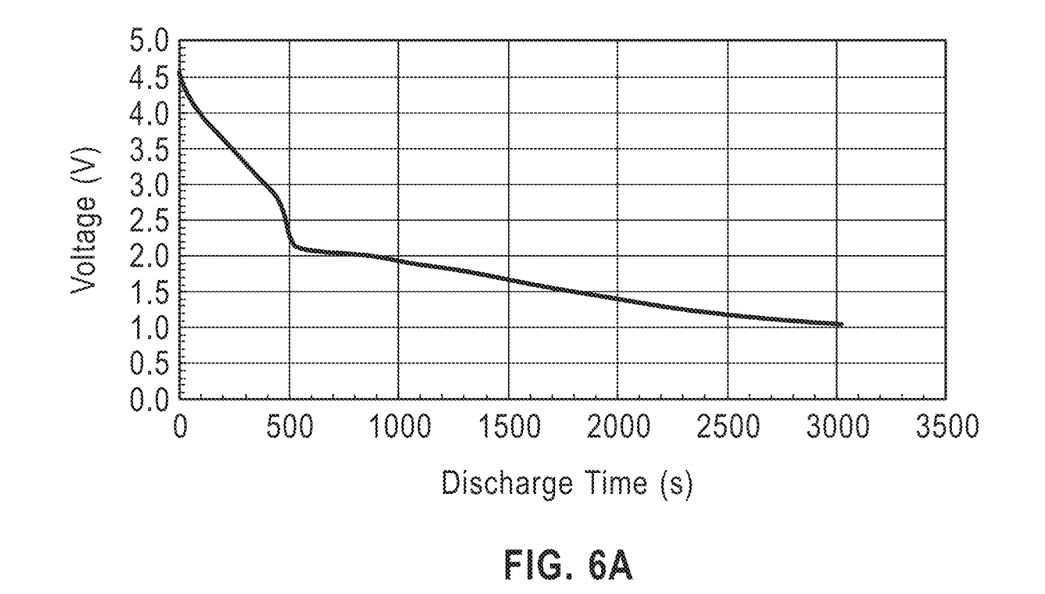
FIG. 6A is a graph of voltage (V) vs. discharge time showing discharge cycle 2 for an energy storage device in accordance with the present application.
Figure 6B:
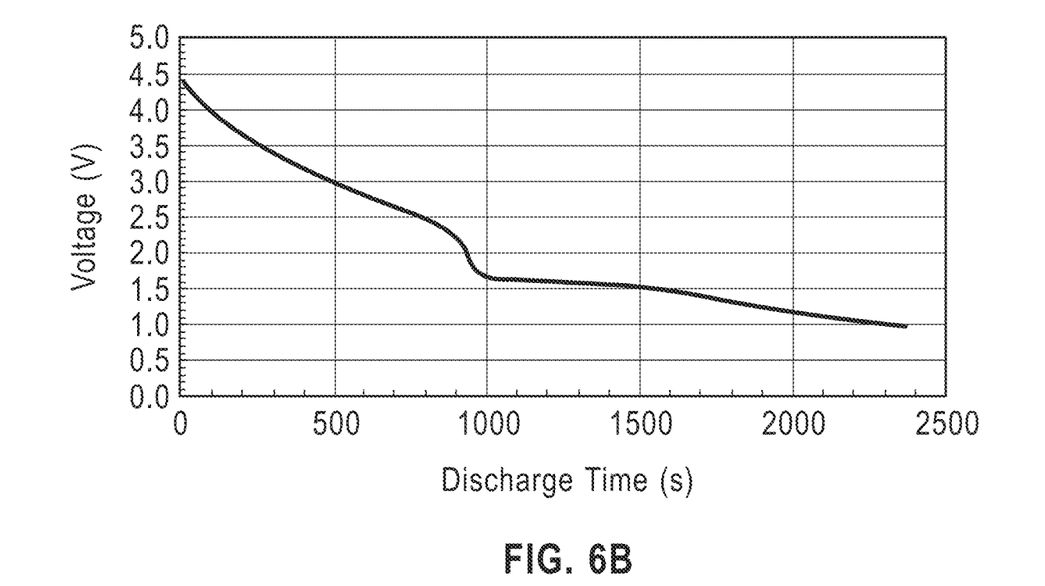
FIG. 6B is a graph of voltage (V) vs. discharge time showing discharge cycle 53 for an energy storage device in accordance with the present application.

Referring now to FIGS. 6A-6B, there are shown graphs of voltage (V) vs. discharge time showing discharge cycle 2 (FIG. 6A) and discharge cycle 53 (FIG. 6B) for an energy storage device in accordance with the present application. The energy storage devices used in providing the data shown in FIGS. 6A-6B includes the preferred energy storage device mentioned above. The significance of both FIG. 6A and FIG. 6B is the following: the working voltage of both discharge curves is between greater than about 4.35V to 1.0V—enabling high energy density, power density and specific capacity performance. Additionally, the change in the length and slope of the initial voltage change illustrates changing structure of the carbon nanotube based cathode. As this initial slope decreases, and time length increases, the magnitude of voltage required to store energy in the carbon nanotube based cathode increases. This can be associated with the amount being stored in more capacitive or double layer type energy storage as the carbon based cathode electrode changes with charge and discharge cycling—where the decreasing slope denotes a more battery/capacitor type charge storage (less than about 950 s in FIG. 6B) vs. more capacitor type charge storage (less than about 500 s FIG. 6A). Simultaneously, the second voltage change component (greater than about 500 s in FIG. 6A and greater than about 950 s in FIG. 6B) decreases in overall slope and length. Namely, the initial part of the second V vs. time curve component decreases in slope and increases in the length of its plateau region, where the length of the voltage plateau in FIG. 6A (~500 s to 950 s) is less than 500 s and length in FIG. 6B (~950 s to 1500 s) is greater than 500 s—where this indicates the increase in intercalation type charge storage as the carbon nanotube based cathode structure changes. The last component of the discharge curves decrease between cycle 2 (FIG. 6A ~950 s to 3000 s) and cycle 53 (FIG. 6B ~1500 s to 2400 s)—where this phenomena may be due to the degradation of the carbon nanotube based electrode structure due to progressive reversible charge storage.

Figure 7A:
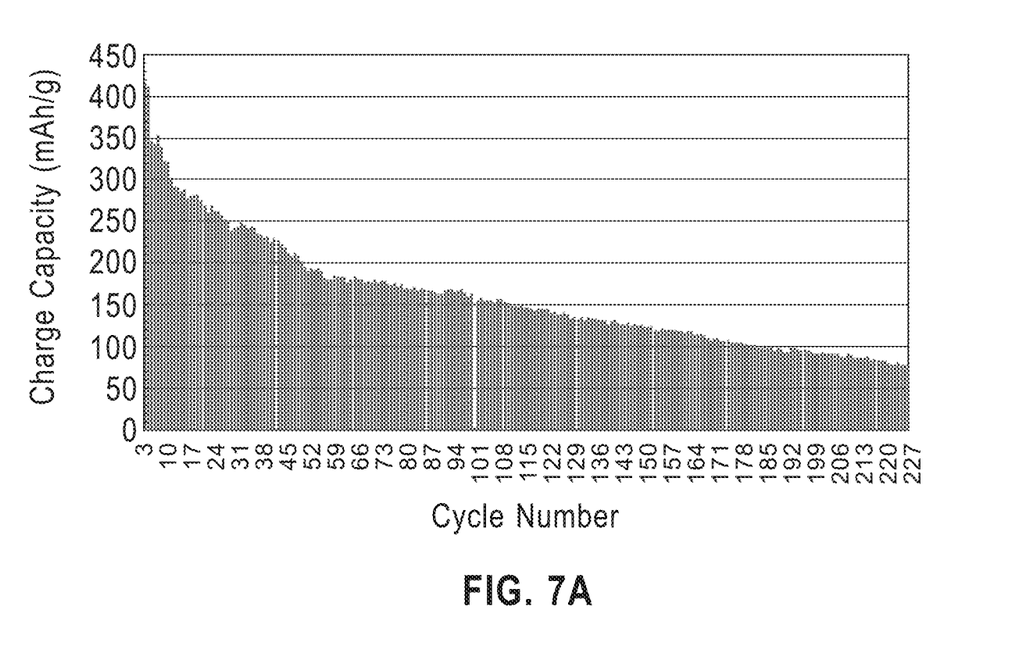
FIG. 7A is a graph of charge capacity (mAh/g) vs. cycle number showing the long-term charge cycling of an energy storage device in accordance with the present application.
Figure 7B:
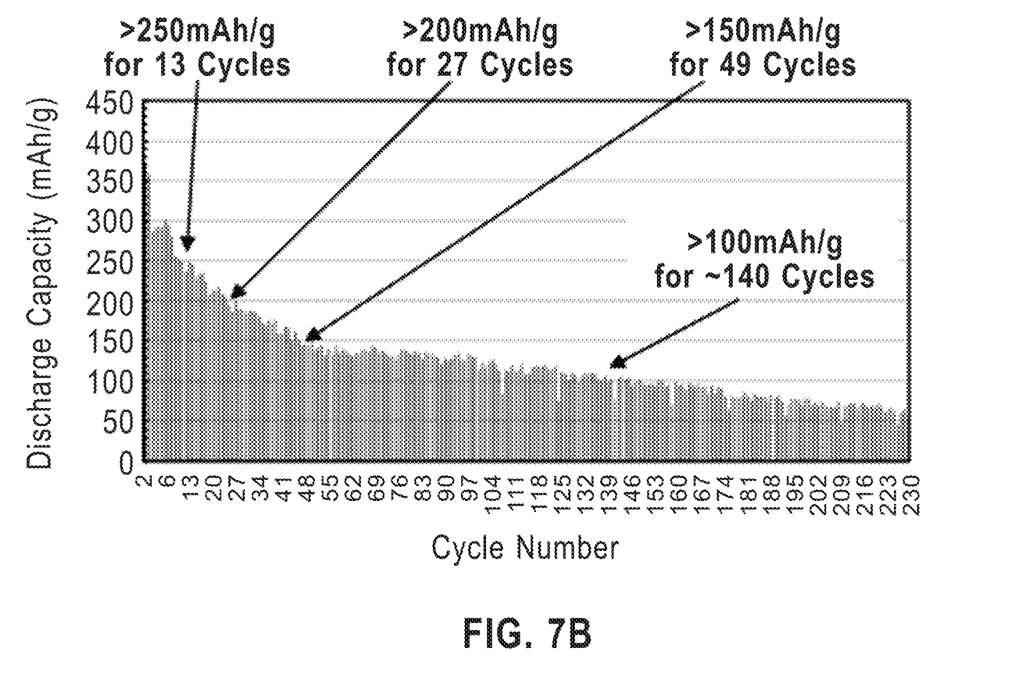
FIG. 7B is a graph of discharge capacity (mAh/g) vs. cycle number showing the long-term discharge cycling of an energy storage device in accordance with the present application.

Referring now to FIGS. 7A-7B, there are provided graphs showing the long-term cycling of the charge and discharge cycling of an energy storage device in accordance with the present application. The energy storage devices used in providing the data shown in FIGS. 7A-7B includes the preferred energy storage device mentioned above. Notably, FIG. 7A is a graph of charge capacity (mAh/g) vs. cycle number showing the long-term charge cycling, while FIG. 7B is a graph of charge capacity (mAh/g) vs. cycle number showing the long-term discharge cycling. 232 Charge and Discharge cycles are exemplified in FIGS. 7A and 7B. Notably, in comparing FIG. 7A and FIG. 7B, one can observe that the relative magnitudes of charge and discharge capacity have approximately the same trend, shape—yielding a high enough coulombic efficiency which enables discharge capacities greater 250 mAh/g for 13 cycles, greater than 200 mAh/g for 27 cycles, greater than 150 mAh/g for 49 cycles and greater than 100 mAh/g for nearly 140 cycles, due to the reversible charge storage sustainable mechanisms described above. Although capacity fade is observed at different degrees under progressive charge and discharge cycling, the extension of sustainable charge storage is enabled via the mechanisms described above, due to the novel materials and combination of the carbon nanotube based cathode and pre-lithiated porous silicon electrode—yielding a novel silicon based porous silicon electrode with extremely high rechargeable specific capacity (e.g., greater than 250 mAh/g) and high cycle life (e.g., greater than 200 cycles).

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. An energy storage device comprising:
   a silicon based anode containing a porous region and a non-porous region, wherein the porous region comprises a top porous layer having a first thickness and a first porosity, and a bottom porous layer having a second thickness that is greater than the first thickness, and a second porosity that is greater than the first porosity, and wherein the bottom porous layer forms an interface with the non-porous region;
   a lithium metal layer located on, and absorbed at least partially into, a topmost surface of the porous region of the silicon based anode;
   a liquid electrolyte having a first surface forming an interface with the lithium metal layer;
   a carbon nanotube based cathode forming an interface with a second surface of the liquid electrolyte, which is opposite the first surface of the liquid electrolyte; and
   an ionic-permeable and electron-insulating separator positioned between the silicon based anode and the carbon nanotube based cathode and configured to separate the liquid electrolyte into a first electrolyte region having the first surface and a second electrolyte region having the second surface.

2. The energy storage device of claim 1, wherein the porous region and the non-porous region of the silicon based anode are both composed of crystalline silicon.

3. The energy storage device of claim 1, wherein the silicon based anode including the porous region and the non-porous region is entirely composed of a p-type doped silicon having a p-type dopant concentration of about $10^{19}$ $cm^{-3}$.

4. The energy storage device of claim 1, wherein the lithium metal layer is present in an entirety of the porous region of the silicon based anode.

5. The energy storage device of claim 1, wherein the lithium metal layer that is located on the topmost surface of the porous region of the silicon based anode has a thickness of 15 nm to 100 nm.

6. The energy storage device of claim 1, wherein the carbon nanotube based cathode is composed of a carbon nanotube active material, a binding agent and a conductive lithium containing salt.

7. The energy storage device of claim 6, wherein the binding agent is polyvinylidene fluoride, and the conductive lithium containing salt is lithium bis(trifluoromethanesulfonyl)imide.

8. The energy storage device of claim 6, wherein the carbon nanotube active material comprises doped carbon nanotubes.

9. The energy storage device of claim 6, wherein the carbon nanotube active material comprises non-doped carbon nanotubes or a combination of doped carbon nanotubes and non-doped carbon nanotubes.

10. The energy storage device of claim 1, wherein the liquid electrolyte comprises a solvent mixture of ethylene carbonate and dimethyl carbonate, a lithium salt comprising lithium hexafluorophosphate, and an additive comprising fluoroethylene carbonate.

11. An energy storage device comprising:
    a crystalline silicon based anode containing a porous region and a non-porous region, wherein the porous region comprises a top porous layer having a first thickness and a first porosity, and a bottom porous layer having a second thickness that is greater than the first thickness, and a second porosity that is greater than the first porosity, and wherein the bottom porous layer forms an interface with the non-porous region;
    a lithium metal layer located on, and absorbed at least partially into, the top porous layer of the crystalline silicon based anode;
    a liquid electrolyte having a first surface forming an interface with the lithium metal layer, wherein the liquid electrolyte comprises a mixture of ethylene carbonate, dimethyl carbonate, lithium hexafluorophosphate, and fluoroethylene carbonate;
    a carbon nanotube based cathode forming an interface with a second surface of the liquid electrolyte, which is opposite the first surface of the liquid electrolyte, wherein the carbon nanotube based cathode is composed of a carbon nanotube active material, polyvinylidene fluoride as a binding agent, and lithium bis(trifluoromethanesulfonyl)imide as a conductive lithium containing salt; and
    an ionic-permeable and electron-insulating separator located in the liquid electrolyte and between the silicon based anode and the carbon nanotube based cathode.

* * * * *